United States Patent [19]

Steves

[11] 3,712,488
[45] Jan. 23, 1973

[54] LAUNCHING DEVICE FOR BOAT TRAILERS

[76] Inventor: Leon F. Steves, 1181 Meade Lane, Flagstaff, Ariz.

[22] Filed: Oct. 28, 1971

[21] Appl. No.: 193,269

[52] U.S. Cl. ..................... 214/82, 254/122, 254/126
[51] Int. Cl. ............................................. B60p 3/10
[58] Field of Search ......... 214/82, 510; 254/122, 126

[56] References Cited

UNITED STATES PATENTS

| | | | |
|---|---|---|---|
| 3,038,617 | 6/1962 | Seegrist | 214/82 |
| 3,682,335 | 8/1972 | Smyth | 214/82 |

Primary Examiner—Robert J. Spar
Attorney—Eric P. Schillin and John A. Robertson

[57] ABSTRACT

A launching device detachably mountable upon the stanchion of a boat trailer to exert force upon the prow of the boat to push the boat rearwardly relative the trailer to launch the boat when the rear portion of the trailer is immersed in water. The device comprises a series of pivotally joined pairs of arms which are capable of extension and retraction in scissors fashion. A crank means rotates a screw which threadedly engages with corresponding pivots to forceably move said pivots alternately closer and farther to effect the contraction and expansion of the device. Expansion of the device exerts pressure upon the prow of the boat thereby urging said boat rearwardly relative the trailer.

5 Claims, 7 Drawing Figures

PATENTED JAN 23 1973

INVENTOR.
LEON F. STEVES
BY
William A. Drummond
ATTORNEY

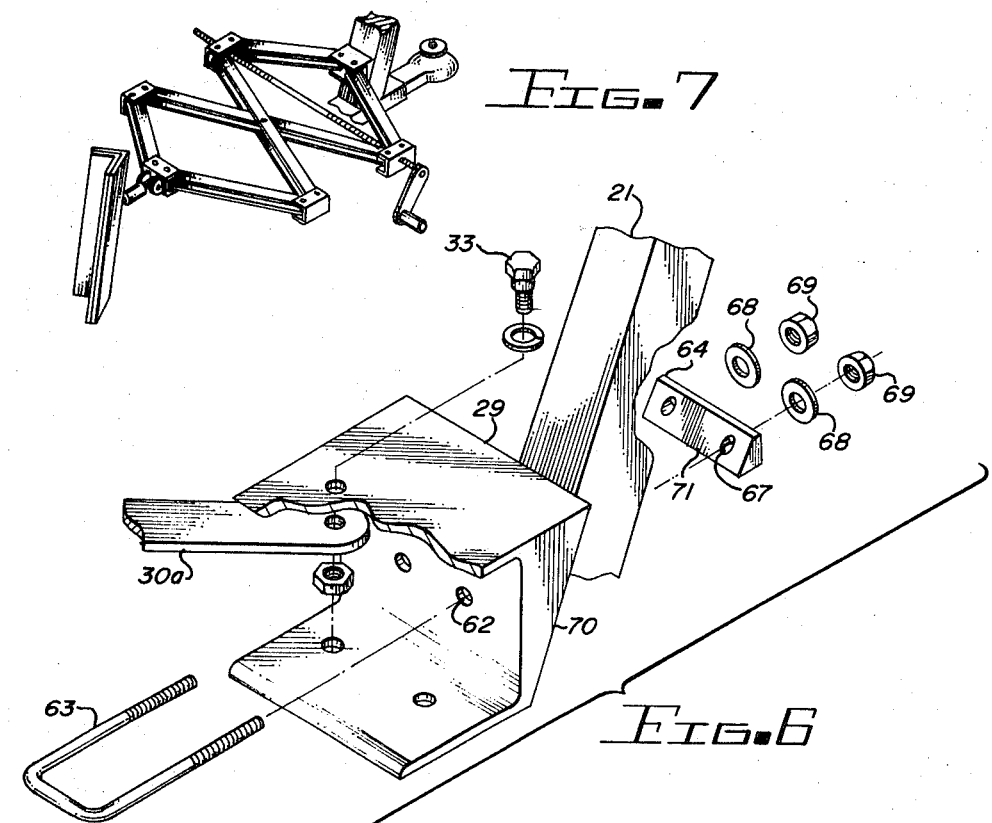
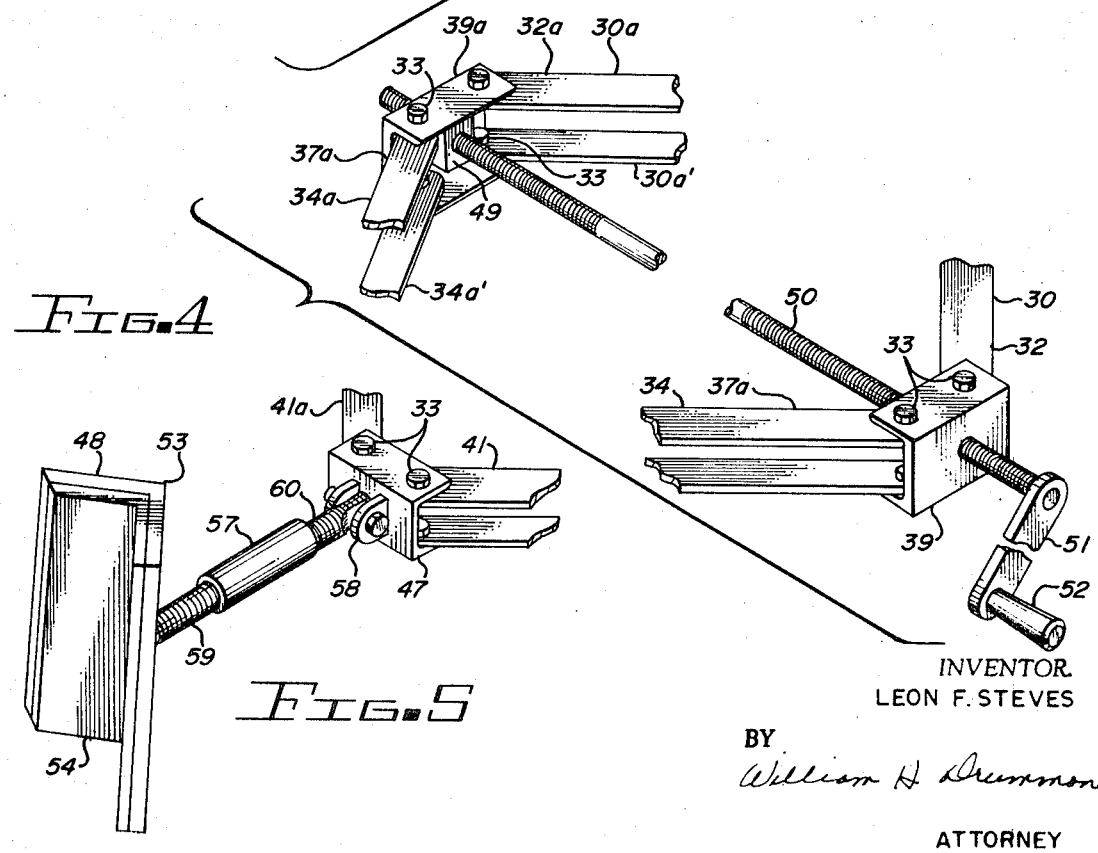

LAUNCHING DEVICE FOR BOAT TRAILERS

This invention relates to trailers adapted to be towed by a powered vehicle and transport a boat thereon.

More particularly, the invention concerns a launching device mountable upon a boat trailer for pushing the boat rearwardly relative the trailer by exerting pressure upon the prow of the boat.

All boat trailers, especially those for hauling heavier, larger trailers, are substantially analogous. In general, such trailers comprise a main frame, supported by a wheeled suspension system and having a forwardly extending tongue with a hitch arrangement at the end thereof for coupling to a powered vehicle. To facilitate moving the boat upon the trailer, the trailer is provided with a keel guide and keel guide rollers, after which the boat is supported within a cradle, generally carpet covered chocks, to cushion the hull of the boat during travel. The boat is usually pulled onto the trailer by a winch supported by a stanchion proximate the front of the trailer.

Loading the boat upon the trailer is a relatively simple operation, even for the novice boatman or those lacking physical strength. The trailer is simply backed into the water until the rear end thereof is immersed slightly below the keel at the prow of the boat. The boat is then driven forward until the hull contacts the keel guide or other roller type hull supports normally carried at the rear of the trailer. A cable from the winch is secured to a bow ring on the prow. The mechanical advantage provided by the winch will permit almost anyone to pull the boat onto the trailer.

Launching the boat, however, normally requires more skill and physical exertion. If the trailer is backed into the water sufficiently to float the boat free of the trailer, it is almost certain that the rear of the towing vehicle will also be submerged. If the trailer is only partly immersed in water, the boat will not float free of the trailer, and in the case of large boats, excessive physical energy must be exerted to push the boat from the trailer. While urging the boat rearwardly from the trailer, sufficient force must be exerted to overcome the weight of the trailer which is amplified by the friction between the chocks and the hull.

Several prior art devices have been proposed to assist in the launching of boats. The most sophisticated device is the trailer commonly known as the tilt-bed type trailer. Tilt-bed trailers are quite ungainly, being of complicated construction and adding appreciably to the weight being towed by the vehicle. They are substantially more costly than non-tilt-bed trailers, and lacking the rigid structure thereof, require increased maintenance. Other systems have been proposed in an attempt to utilize the more desirable solid frame trailer whereby various devices are attached to the frame thereof. One type of device utilizes the cable from the winch whereby the cable is played out and engaged over pulleys located at the rear of the trailer, then returned to the forward part of the trailer where it is attached to a prow cradle or the bow ring. The winch is then used to pull the boat from the trailer much in the same manner as it is used to pull the boat onto the trailer. This type of device requires that the winch carry an excessive, unwieldy amount of cable. It also requires additional sets of pulleys to be mounted on the trailer, which ultimately requires additional maintenance.

Another device is a simple pry bar arrangement. It provides no assist in the actual launching of the boat, and is simply used to break the adherence between the hull and the chocks, whereafter the boat must be pushed manually from the trailer.

It would be highly advantageous, therefore, to provide a simplified device for launching boats from non-tilt-bed trailers.

It is a principal object of the present invention, therefore, to provide a device for pushing boats rearwardly relative boat trailers.

Another object of the present invention is the provision of a boat launching device which is readily mountable to the stanchion of a boat trailer.

Yet another object of the present invention is the provision of a boat launching device having sufficient mechanical advantage that relatively little physical exertion will suffice to launch an exceedingly heavy boat.

Still another object of the present invention is the provision of a boat launching device of the above type which is readily mountable upon various types of trailers and adaptable to launch various configurations of boats therefrom.

Yet still another object of the present invention is the provision of a boat launching device which is relatively simple to operate, inexpensive to manufacture, and requiring minimum maintenance.

These and other, further and more specific objects and advantages of the present invention will become readily apparent to those skilled in the art from the following detailed description thereof, taken in conjunction with the drawings, in which:

FIG. 4 is a partial isometric view specifically detailing the means whereby the boat launcher of the present invention is expanded and contracted;

FIG. 5 is a partial isometric view of that portion of the device utilized to exert pressure upon the prow of the boat;

Figure 1:
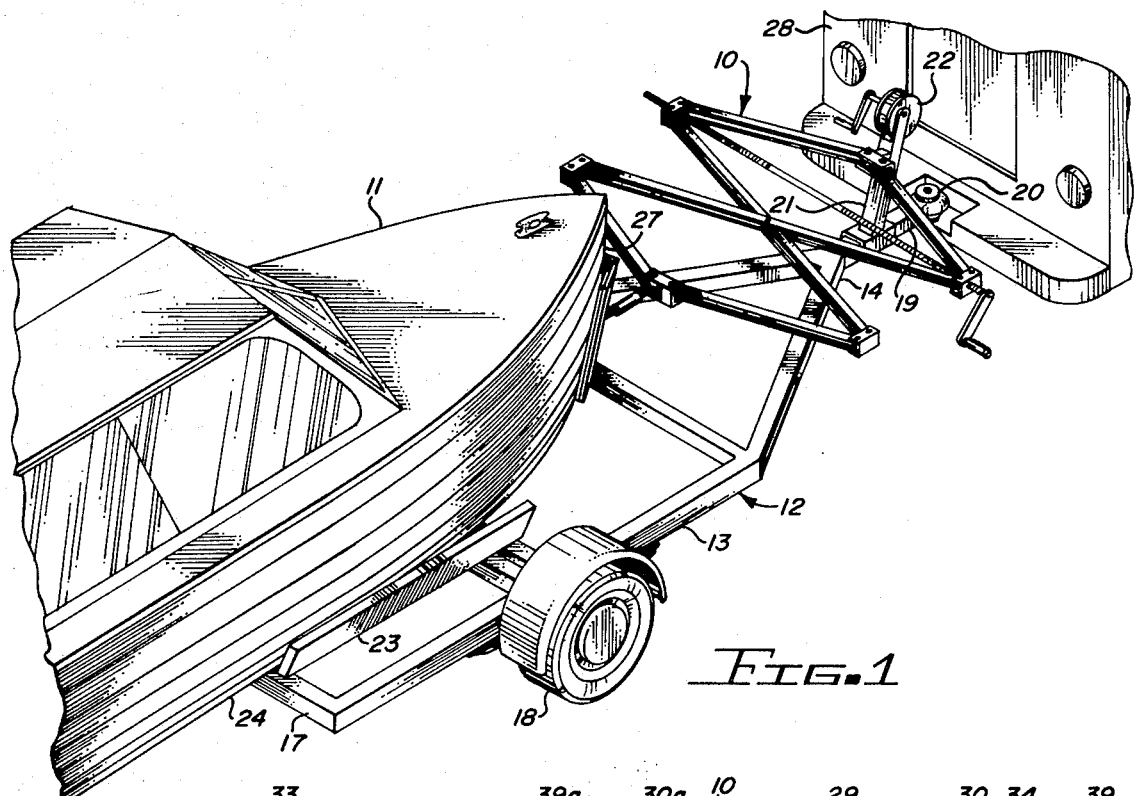
FIG. 1 is a partial perspective view of a conventional non-tilt-bed trailer supporting a boat thereon and utilizing the device of the present invention to launch the boat therefrom.

FIG. 6 is an exploded partial isometric view specifically illustrating a preferred method of securing the boat launcher of the present invention to a boat trailer; and FIG. 7 is an alternate and preferred embodiment of the invention which operates in exactly the same manner as the launching device of FIG. 1 except that it is narrower in unextended width, thus permitting the combination of powered vehicle and boat trailer to have a shorter turning radius.

Briefly, to accomplish the desired objectives of my present invention, in accordance with the preferred embodiment thereof, I first provide a mounting bracket securable to the stanchion of the boat trailer. A first pair of elongate arms are pivotally secured about a vertical axis of rotation at one end thereof to the mounting bracket. The arms extend horizontally divergent from the mounting bracket. One of each of a second pair of elongate arms, substantially longer than the first pair of arms, is pivotally secured about a vertical axis of rotation at one end thereof to the free end of the first pair of arms. The second pair of arms extend from their respective pivotal mounts horizontally convergent to cross proximate the common center of both length of arms. The common center of the arms are pivotally connected about a vertical axis. One of each of a third pair of elongate arms, at least as long as the first pair of arms, is pivotally secured at one end thereof about a vertical axis to the free end of the second pair of arms. The third pair of arms extend horizontally convergent from the second pair of arms to a second bracket and are pivotally secured thereto about a vertical axis of rotation.

A cradle extends from the second bracket for engaging and mating with the prow of the boat. Means are provided for reacting upon the pivotal securements to control the distance between the mounting bracket and the second bracket, in which the assemblage of arms expand and contract in accordian fashion.

A preferred means for expanding and contracting the assemblage of arms comprises a pair of brackets, one of each of said brackets being integral with the respective pivotal securement of each of the ends of the first pair of arms and the corresponding ends of the second pair of arms. Threaded axially aligned apertures extend horizontally through each of these brackets. One aperture carries a left-hand thread while the other aperture carries a right-hand thread. A shaft having substantially one half thereof threaded in one direction of rotation while the other half thereof is threaded in the alternate direction of rotation engages and mates with the threaded apertures of the bracket. A crank arm and handle secured to one end of the shaft provides for manual rotation of the shaft. According to a principle well-known in mechanics, subsequent rotation of the shaft in one direction causes the brackets to advance inwardly to the center of the shaft and, conversely, rotation in the shaft in the opposite direction causes the shaft to advance in the opposite direction along the shaft away from each other.

As the brackets advance along the shaft, carrying the respective pivots and corresponding ends of the respective arms therewith, each of the other pivotal securements at the respective ends of the corresponding arms react analogously, thus providing the accordian fashion expansion and contraction of the boat launching device.

With the device in the retracted position, the boat may be pulled upon the trailer, normally by the winch, until the prow of the boat mates with the cradle at one end of the launching device. When it is desired to launch the boat, the boat trailer is backed to the edge of the water until the rear end thereof is immersed. This immersion need only be enough to provide flotation of that portion of the boat bearing directly upon the rearward limited portion of the trailer. It is understood here, of course, that the trailer is on an incline descending into the water as is normally provided by boat launching ramps or the normal slope of the shore. Therefore, while the rearward portion of the boat may actually be buoyant, the forward portion thereof is still resting with its full weight upon the forward portion of the trailer and in frictional engagement with the forward portion, or in some cases, the total length of the chocks.

Rotation of the crank expands the launching device urging the boat rearwardly relative to the trailer until the entire trailer has passed the point of buoyancy as determined by that portion of the trailer immersed in the water. At this point, the boat has floated free of the trailer without exertion of any excessive physical force. It is particularly noted that the threaded arrangement between the shaft and the corresponding threaded brackets provides substantial mechanical advantage to simplify launching even the largest and heaviest boats. The desirable mechanical advantage can be established for various weights of boats by the selection of proper pitch of the threads and corresponding length of the crank.

Turning now to the drawings in which the same reference numerals indicate corresponding elements throughout the several views, FIGS. 1 and 7 show the launching device of the present invention, generally designated by the reference character 10, as it might appear while launching the boat 11 from the trailer 12. The trailer 12 is a conventional non-tilt type boat trailer having a generally elongate load bearing frame 13 having a forward end 14 and a rearward end 17 supported by a wheeled running gear 18. A tongue 19 having a hitch arrangement 20 extends forwardly from the frame 13. A stanchion 21 supporting a winch 22 is welded or otherwise affixed to the forward end of the trailer. A pair of parallel chocks 23 spaced to accommodate the boat hull 24 support the boat upon the frame in co-axial longitudinal alignment therewith with the prow 27 of the boat normally carried forwardly. The powered vehicle, here shown in part as a pickup truck and camper unit 28, couples with the hitch 20 for towing the trailer.

Figure 3:
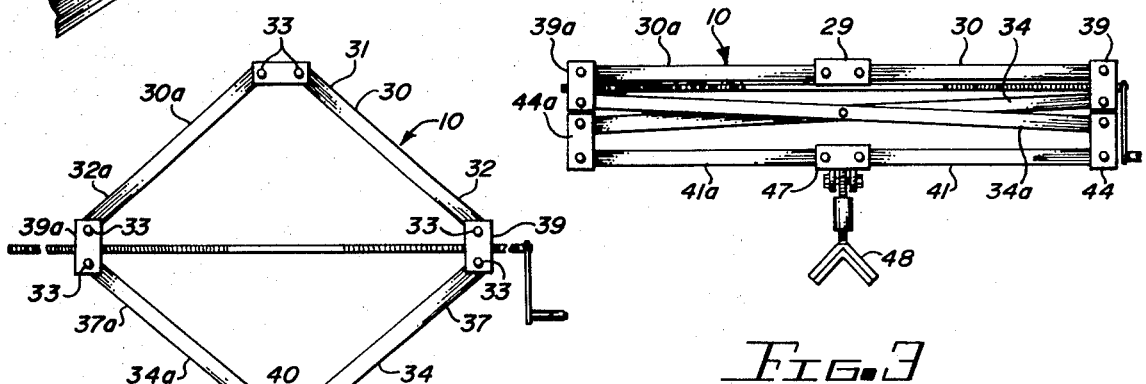
FIG. 3 is a plan view of the device of FIG. 2 when the device is in the retracted position.
Figure 2:
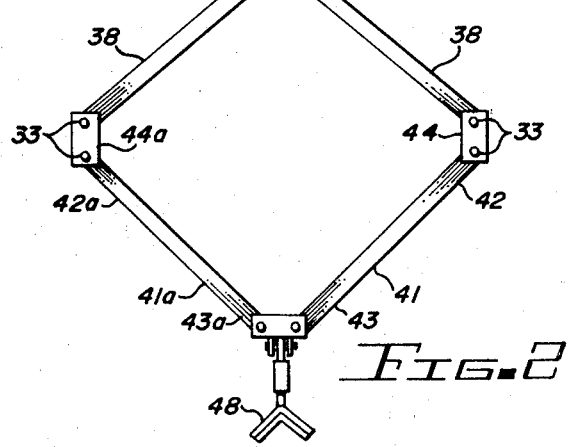
FIG. 2 is a plan view of a boat launcher constructed in accordance with the teachings of the present invention as it might appear in the launching or extended position.

FIGS. 2 and 3 show the boat launching device of the present invention in the expanded and contracted positions respectively. A mounting bracket 29 at one end of the launching device 10 is securable to the stanchion 21. The mounting bracket 29 and a preferred method for attaching the bracket to the stanchion will be hereinafter described in further detail. A first pair of elongate arms 30 and 30a having first ends 31 and 31a and second ends 32 and 32a are pivotally secured at the first ends thereof by appropriate vertically disposed fastening devices 33. Suitable fasteners for this purpose may include such devices as rivets or bolts. As herein seen, the pair of arms 30 and 30a extend horizontally divergent from the mounting bracket 29. A second pair of elongate arms 34 and 34a, substantially longer than the first pair of arms, having first ends 37 and 37a and second ends 38 and 38a extend horizontally convergent from the first ends thereof. While the first ends 37 and 37a of the arms 34 and 34a may be pivotally secured to the second ends 32 and 32a to the first pair of arms 30 and 30a, I prefer the arrangement herein shown to incorporate intermediate brackets 39 and 39a. Each respective bracket 39 and 39a is secured by appropriate pivotal fastening expediencies 33 to the second ends 32 and 32a of the brackets 30 and 30a respectively and to the first ends 37 and 37a of the second pair of arms 34 and 34a analogously to the pivotal securement of the first ends 31 and 31a of the first pair of arms 30 and 30a respectively to the mounting bracket 29. Specific details of the intermediate brackets 39 and 39a and all subsequent brackets of the instant device will hereinafter be shown in explicit detail. It is also herein noted that the arms 34 and 34a cross in overlapping arrangement at the common center of each respective arm. A mechanical fastener 40 pivotally unites the arms 34 and 34a at their common center of length.

A third pair of elongate arms 41 and 41a, at least as long as the first pair of arms, having first ends 42 and 42a and second ends 43 and 43a are secured at the first ends thereof to intermediate brackets 44 and 44a. The brackets 44 and 44a support pivotal fasteners 33 to secure the second ends 38 and 38a of the second pair of elongate arms 34 and 34a respectively to the first ends 42 and 42a of the third pair of arms 41 and 41a in a manner directly similar to the arrangement heretofore described in connection with the first pair of brackets 39 and 39a. The third pair of arms 41 and 41a extend horizontally convergent from the brackets to intermediate brackets 44 and 44a respectively and are pivotally secured at their respective second ends 43 and 43a to a second bracket 47 by additional pivotal fasteners 33. A boat cradle 48 for abutting and mating with the prow of the boat, as will be hereinafter described in further detail, is supported by and extends horizontally from the second bracket 47.

While each arm is the same length as its corresponding mate, the length thereof may vary from the length of each other pair of arms within mechanically definable limits. However, to achieve the compact retracted device as specifically shown in FIG. 3, I prefer that the first pair of arms 30 and 30a be of equal length to the third pair of arms 41 and 41a, while the second pair of arms 34 and 34a is substantially as long as the extended length of either the first or third pair of arms. Similarly, while the second and first ends of each adjoining arm may be directly pivotally adjoined, the incorporation of the intermediate brackets 39 and 39a and 44 and 44a into the preferred design function to serve as limit stops in the retracted position by the abutment of the second pair of brackets 44 and 44a against the first pair of intermediate brackets 39 and 39a respectively. The intermediate brackets also provide functional stability and accommodate the attachment of the means for expanding and contracting the device.

The means for expanding and contracting the device are best shown in FIG. 4. A nut 49 having a horizontally threaded aperture extending therethrough is affixed by welding or other suitable expediency to the bracket 39a. It will be appreciated that the nut 49 need not necessarily be an attachment being formed integrally with the bracket 39a during the manufacture thereof. The instant threaded aperture may carry either a left-hand or a right-hand screw flight. Not herein specifically shown, but to be understood by those skilled in the art, a similar threaded aperture having a screw flight of opposite rotation is carried by the bracket 39. A shaft 50 extends through the threaded apertures having one end thereof. Substantially one half of the shaft 50 carries an external screw flight adapted to mate with the first threaded aperture, while the second half thereof carries a screw flight of alternate rotation to engage with the second threaded aperture. A crank 51 having a crank handle 52 is affixed to one end of the shaft 50. In a more sophisticated embodiment, the shaft may be driven by a reversible electric motor deriving electrical energy from the towing vehicle or auxiliary battery carried upon the trailer. Considering this arrangement, it is well-known in the field of mechanics that the rotation of the shaft 50 as effected in this particular case by manual manipulation of the crank and crank handle 51 and 52 respectively causes the intermediate brackets 39 and 39a to advance along the shaft in opposite directions. Consequently, rotation of the shaft 50 in one direction forces the intermediate brackets 39 and 39a closer together, while alternate rotation of the shaft 50 forces the intermediate brackets 39 and 39a apart. Relative movement between the brackets 39 and 39a equally reacts upon the second pair of intermediate brackets 44 and 44a and effects expansion and contraction of the launching device as illustrated in FIGS. 2 and 3.

While the device heretofore described is functionally adequate, the weight of the boat to be launched dictates the cross-sectional size of each pair of arms to achieve the required strength and rigidity. To maintain a relatively compact unit while greatly increasing the strength thereof, each arm of each pair of arms may within itself be a pair of arms, as is further illustrated in FIG. 4. As herein shown, the bracket 39a is U-shaped having arms 30a and 34a secured to the upper horizontal leg thereof while corresponding arms 30a' and 34a' are pivotally secured to the lower horizontal leg by fasteners 33.

Referring now to FIG. 5, the boat cradle 48 and its securement to the second bracket 47 is shown in greater detail. The cradle 48 comprises an outer V-shaped rigid member 53, preferably constructed of metal, supporting a resilient inner liner 54. The cradle 48 can be constructed in a variety of shapes to accommodate various shaped boat prows while the resilient liner 54, preferably molded of soft plastic or rubber, provides adequate cushioning to avoid damage thereto. A shaft 57 extends horizontally from the cradle 48 and is secured at the opposite end thereof to a clevis 58 supported by the second bracket 47. In accordance with my preferred embodiment, the shaft 57 comprises a first threaded rod 59 secured to the cradle 48 and a second threaded rod 60 held by the clevis 58. The threaded rods 59 and 60 are adjoined by an internally threaded coupling 61. It will be readily understood by those skilled in the art that if the threaded rods 59 and 60 contain opposite advancing screw flights and the coupler 51 is threaded half way in from either end to mate with each of the respective rods 59 and 60, adjustment can be made to vary the length at the shaft 57.

Attention is now directed to FIG. 6 which illustrates a preferred method of attaching the boat launching device to the boat trailer. Apertures 62 extending through the mounting bracket 29 are spaced to accommodate a conventional U-bolt 63. Securing the launching device to the boat trailer, the U-bolt 63 is inserted through the aperture 62 to straddle the stanchion 21. A back-up plate 64 having apertures 67 therein corresponding with the apertures 62 is fitted over the free ends of the U-bolt. Washers 68 and nuts 69 are engaged, one with each threaded end of the U-bolt 63, to position and clamp the mounting bracket 29 to the stanchion 21. As herein specifically illustrated, the stanchion 21 is at an angle to a horizontal, as is conventional manufacturing specification. The mounting bracket 29 has an inclined fact 70 while the back-up plate 64 has a corresponding inclined face 71 to accommodate the slope of the stanchion and maintain the launching device in horizontal arrangement. Several variations are obvious. The mounting bracket 29 and the back-up plate 64 may have vertical faces to accommodate vertical stanchions, while spacers having variously inclined faces may be provided between the mounting bracket 29 and the back-up plate 64 to accommodate variously inclined stanchions.

Having fully described and disclosed the invention and what I conceive to be the presently preferred embodiment thereof, in such a manner as to enable those skilled in the art to understand and practice the same,

I claim:

1. In a boat trailer adapted to be towed by a powered vehicle and releasably support a boat thereon, which trailer includes:

a generally elongate load bearing frame having a forward end and a rearward end, wheeled running gear for supporting said frame, a tongue extending forwardly from said frame and having a hitch arrangement at the free end thereof for coupling to said powered vehicle, boat support means secured upon the top of said frame, a stanchion proximate the front of said trailer, and winch means secured to said stanchion for pulling said boat onto said trailer to be supported by said boat support means, whereby said boat normally is carried upon said support means in co-axial longitudinal alignment with said frame, the prow of said boat being proximate said stanchion, the improvements in said boat trailer adapted to assist in launching said boat by moving said boat rearward relative to said trailer whereby said boat may float free of said trailer when the rearward end of said trailer is immersed in water, which improvements comprise:

a. a mounting bracket securable to said stanchion;

b. a first pair of elongate arms having a first end and a second end pivotally secured about a vertical axis of rotation at the first end thereof to said mounting bracket and extending horizontally divergent therefrom;

c. a second pair of elongate arms, substantially longer than said first pair of arms, and having first and second ends, one of each of said arms pivotally secured at the first end thereof about a vertical axis of rotation to the second end of one of said first pair of elongate arms, said arms extending horizontally convergent from said pivotal securement to cross proximate at the common center of the length of both said arms and having a pivotal securement about a vertical axis at said common center at the length of said arms;

d. a third pair of elongate arms at least as long as the first said pair of arms, and having first and second ends; each said arm pivotally secured about a vertical axis of the first end thereof to the second end of said second pair of arms and extending horizontally convergently therefrom;

e. a second bracket pivotally secured to the second ends of said third pair of elongate arms, each said arm pivotally secured thereto about a vertical axis of rotation;

f. means extending from said second bracket for cradling the prow of said boat; and g. means reacting upon each said pivotal securement to controllably vary the distance between the said mounting bracket and said second bracket.

2. The improved boat launcher of claim 1 wherein said means for controllably varying the distance between the said mounting bracket and said second bracket includes:

a. a first bracket integral with the pivot mount of one end of said second arm and having a horizontally threaded aperture therethrough;

b. a second bracket integral with the pivot mount of the same end of said second arm as said first bracket and having a horizontally threaded aperture of reverse rotation from the threaded aperture of said first bracket extending therethrough said first bracket substantially parallel to said second bracket wherein the longitudinal axis of the threaded aperture of said first bracket is in horizontal axial alignment with the axis of the aperture of said second bracket;

c. a shaft having threaded portions of opposite rotation extending inwardly from either end thereof and extending through the aperture of said bracket and the aperture of said second bracket and having the threaded portions thereof threadedly engaging the corresponding rotationally threaded aperture of each said bracket; and d. means for rotating said threaded shaft.

3. The boat launcher of claim 1 wherein said means extending from said second bracket for abutting the prow of said boat includes:

a. a shaft having a first end and a second end pivotally secured about a horizontal axis of rotation at the first end thereof to said second bracket, and b. an upstanding cradle secured to the second end of said shaft said cradle substantially sized and shaped to engage and mate with the prow of said boat.

4. The boat launcher of claim 3 wherein said cradle is detachably secured to said shaft.

5. The boat launcher of claim 3 including means for adjusting the length of said shaft.

* * * * *